United States Patent
Faulkner et al.

(10) Patent No.: US 6,942,711 B2
(45) Date of Patent: Sep. 13, 2005

(54) HYDROENTANGLED FILTER MEDIA WITH IMPROVED STATIC DECAY AND METHOD

(75) Inventors: Richard Faulkner, Salisbury, NC (US); Ping Hao, Charlotte, NC (US); Per Lindblom, Huntersville, NC (US)

(73) Assignee: Polymer Group, Inc., North Charleston, SC (US)

( * ) Notice: Subject to any disclaimer, the term of this patent is extended or adjusted under 35 U.S.C. 154(b) by 0 days.

(21) Appl. No.: 10/690,030

(22) Filed: Oct. 21, 2003

(65) Prior Publication Data

US 2004/0211163 A1 Oct. 28, 2004

Related U.S. Application Data

(60) Provisional application No. 60/420,150, filed on Oct. 22, 2002.

(51) Int. Cl.[7] .............................................. B01D 39/16
(52) U.S. Cl. .............................. 55/486; 55/487; 55/524; 55/527; 55/528; 428/219; 428/359; 442/57; 442/327; 442/384; 442/408; 442/410; 442/411; 210/500.1; 210/505; 210/508
(58) Field of Search ..................... 55/302, 361, 381, 55/382, 486, 487, 522, 524, 527, 528; 428/98, 219, 359, 364; 442/26, 57, 327, 356, 357, 358, 384, 408, 409, 410, 411; 28/104, 105; 210/500.1, 503, 505, 507, 508

(56) References Cited

U.S. PATENT DOCUMENTS

| | | | |
|---|---|---|---|
| 3,485,706 A | * | 12/1969 | Evans .......................... 28/105 |
| 4,270,933 A | * | 6/1981 | Meny et al. ................... 55/524 |
| 4,329,309 A | | 5/1982 | Kelly |
| 4,381,326 A | | 4/1983 | Kelly |
| 4,556,601 A | * | 12/1985 | Kirayoglu ..................... 28/104 |
| 4,612,237 A | * | 9/1986 | Frankenburg ................. 55/528 |
| 4,983,434 A | | 1/1991 | Sassa |
| 5,098,764 A | | 3/1992 | Bassett et al. |
| 5,151,320 A | * | 9/1992 | Homonoff et al. .......... 442/408 |
| 5,240,764 A | * | 8/1993 | Haid et al. ................... 442/408 |
| 5,244,711 A | | 9/1993 | Drelich et al. |
| 5,290,628 A | * | 3/1994 | Lim et al. .................... 442/408 |
| 5,678,379 A | | 10/1997 | Quattrociocchi |
| 5,822,823 A | | 10/1998 | Polzin et al. |
| 5,827,597 A | | 10/1998 | James et al. |
| 6,114,017 A | | 9/2000 | Fabbricante et al. |
| 6,191,211 B1 | | 2/2001 | Mussell et al. |
| 6,264,864 B1 | | 7/2001 | Mackay |
| 6,502,288 B2 | * | 1/2003 | Black et al. ................... 28/104 |
| 6,576,323 B2 | * | 6/2003 | Wise et al. .................. 442/118 |
| 6,695,941 B2 | * | 2/2004 | Hartgrove et al. ............ 28/104 |
| 2002/0187703 A1 | * | 12/2002 | Pearce et al. ................ 442/408 |
| 2003/0009862 A1 | * | 1/2003 | Black et al. ................... 28/104 |
| 2003/0143912 A1 | * | 7/2003 | Black et al. ................. 442/408 |

* cited by examiner

Primary Examiner—Duane Smith
Assistant Examiner—Jason M. Greene
(74) Attorney, Agent, or Firm—Wood, Phillips, Katz, Clark & Mortimer

(57) ABSTRACT

The present invention is directed to a filter media comprised of an electro-conductive scrim so as to improve on the dissipation time of an electrostatic charge. Further, the present invention is directed to a method of making such a filter media, which is formed through hydroentanglement, thus avoiding the deleterious effects of mechanical needling, while providing a filter media having the requisite strength characteristics, without possessing a limiting factor in performance. The filtration media of the present invention also demonstrates a highly desirable uniformity for cost-effective use.

5 Claims, 2 Drawing Sheets

HYDROENTANGLED FILTER MEDIA WITH IMPROVED STATIC DECAY AND METHOD

CROSS-REFERENCE TO RELATED APPLICATION

This application claims the benefit of application Ser. No. 60/420,150, which was filed on Oct. 22, 2002.

TECHNICAL FIELD

The present invention relates generally to a nonwoven fabric employed as a filter media, and more particularly to a filter media comprising a hydroentangled nonwoven fabric comprised of a electro-conductive scrim, and a method of making the filter media through the use of a foraminous surface.

BACKGROUND OF THE INVENTION

Filtration of fluids such as gases requires the removal of typically particulate or disparate impurities from the gas stream in order to limit introduction of the impurities into the environment, or circulation back into the associated process. It is ordinarily desirable to maximize the surface area available for filtration so as to remove large amounts of undesirable contaminants from the fluid stream, while maintaining the operating pressure differential induced by the filter as low as possible to achieve long service life and minimize surface strain.

One form of filtration is typically referred to as interception, that is, the filter media functions in the nature of a sieve that mechanically entraps particles larger than the pore size inherent to the media. Larger particles are removed from the fluidic stream by the openings in the filter media, with particles building on top of one another to create a filter cake that removes successively smaller particles.

More specifically, in a so-called "baghouse filter", particulate material is removed from a gaseous stream as the stream is directed through the filter media. In a typical application, the filter media has a generally sleeve-like tubular configuration, with gas flow arranged so as to deposit the particles being filtered on the exterior of the sleeve. In this type of application, the filter media is periodically cleaned by subjecting the media to a pulsed reverse-flow, which acts to dislodge the filtered particulate material from the exterior of the sleeve for collection in the lower portion of the baghouse filter structure. U.S. Pat. No. 4,983,434, hereby incorporated by reference, illustrates a baghouse filter structure and a prior art filter laminate.

Heretofore, nonwoven fabrics have been advantageously employed for manufacture of filter media. Generally, nonwoven fabrics employed for this type of application have been entangled and integrated by mechanical needle-punching, sometimes referred to as "needle-felting", which entails repeated insertion and withdrawal of barbed needles through a fibrous web structure. While this type of processing acts to integrate the fibrous structure and lend integrity thereto, the barbed needles inevitably shear large numbers of the constituent fibers, and undesirably create perforations in the fibrous structure, which act to compromise the integrity of the filter and can inhibit efficient filtration. Needle-punching can also be detrimental to the strength of the resultant fabric, requiring that a suitable nonwoven fabric have a higher basis weight in order to exhibit sufficient strength for filtration applications.

U.S Pat. No. 4,556,601 to Kirayoglu discloses a hydroentangled, nonwoven fabric, which may be used as a heavy-duty gas filter. This filtration material however, cannot be subjected to a shrinkage operation. Exposure of the described fabric to a shrinkage operation is believed to have a negative effect on the physical performance of the filtration material.

In addition, some filtration devices utilize a wire grid or mesh within or in direct contact with the filter construct, which results in a filtration device that is highly susceptible to becoming electrostaticly charged. The use of filtration devices comprised of metal wiring within adverse environments, such as in the filtration of coal particulates, are more prone to ignite under volatile conditions.

The present invention is directed to a filter media comprised of an electro-conductive scrim so as to improve on the dissipation time of an electrostatic charge. Further, the present invention is directed to a method of making such a filter media, which is formed through hydroentanglement, thus avoiding the deleterious effects of mechanical needling, while providing a filter media having the requisite strength characteristics, without possessing a limiting factor in performance. The filtration media of the present invention also demonstrates a highly desirable uniformity for cost-effective use.

SUMMARY OF THE INVENTION

A filter media formed in accordance with the present invention comprises hydroentangled, predominantly polyester staple length fibers having a basis weight of no more than about 6 oz/yd$^2$. The filter media exhibits a Mullen burst strength of at least about 198 psi, and machine-direction and cross-direction shrinkage of less than about 3%, preferably less than about 2%. The filter media exhibits a machine-direction tensile strength of at least about 52 lb/in, and a cross-direction tensile strength of at least about 55 lb/in.

The present filter media is formed by providing a precursor web comprising predominantly staple length polyester fibers and attaching the precursor web to an electro-conductive scrim. The precursor web along with the electro-conductive scrim are juxtaposed on the foraminous surface, and hydroentangled to form the present filter media in the form of a nonwoven laminate fabric. The present method further comprises providing a foraminous surface, which may be configured to impart a repeating pattern to the filter media being formed for enhancing its filtration capabilities.

It is within the purview of the present invention that the filter media be heat-set subsequent to hydroentangling. By the inclusion of fusible fibers in the precursor web, heat-setting of the filter media can desirably result in thermal bonding of the media, thus enhancing the strength characteristics of the material.

Other features and advantages of the present invention will become readily apparent from the following detailed description, the accompanying drawings, and the appended claims.

DETAILED DESCRIPTION

Figure 1:
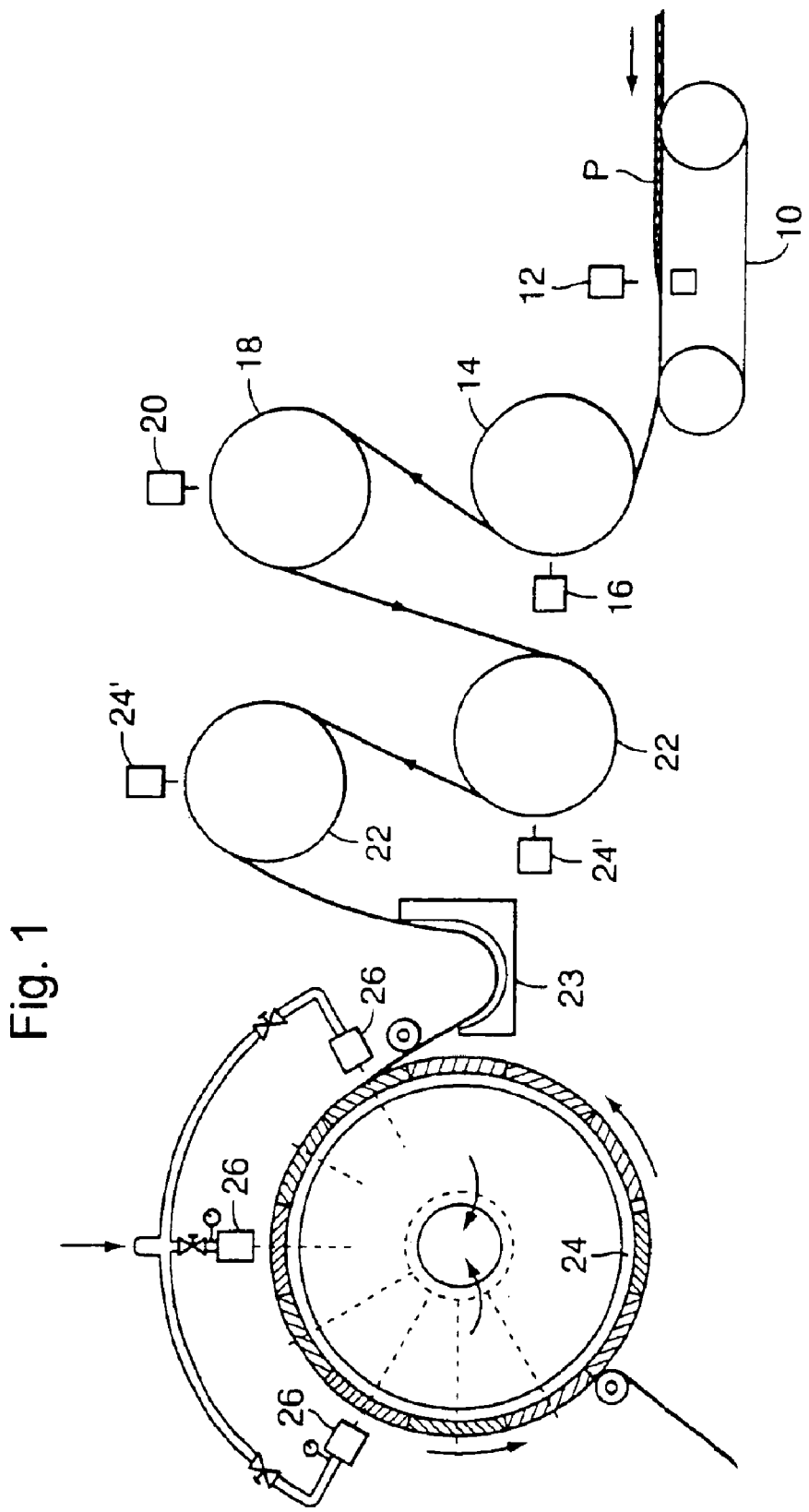
FIG. 1 is a diagrammatic view of the apparatus for practicing the method of the present invention for forming a nonwoven fabric.

While the present invention is susceptible of embodiment in various forms, there is shown in the drawings, and will hereinafter be described, a presently preferred embodiments, with the understanding that the present disclosure is to be considered as an exemplification of the invention, and is not intended to limit the invention to the specific embodiments illustrated.

The present invention described herein includes the uses of hydroentangled nonwovens as described below, is a direct replacement for needled felts in all such applications where such materials are currently used. These applications include air filtration, tubular and sheet form, used in air handling, and liquid filtration systems, as represented by baghouse stations, and automatic transmission fluid filters, and other specialty applications where needled felts are employed. Further, the hydroentangled filtration media of the present invention includes a electro-conductive scrim so as to assist in the dissipation of an electrostatic charge that may accumulate on the filtration device.

With particular reference to FIG. 1, therein is illustrated an apparatus for practicing the method of the present invention for forming a nonwoven fabric. The fabric is formed from a fibrous matrix, which comprises fibers selected to promote economical manufacture. The fibrous matrix is preferably carded and subsequently cross-lapped to form a precursor web, designated P.

FIG. 1 illustrates a hydroentangling apparatus for forming nonwoven fabrics in accordance with the present invention. The apparatus includes a foraminous-forming surface in the form of a flat bed entangler 12 upon which the precursor web P is positioned for pre-entangling. Precursor web P is then sequentially passed under entangling manifolds 14, whereby the precursor web is subjected to high-pressure water jets 16. This process is well known to those skilled in the art and is generally taught by U.S. Pat. No. 3,485,706, to Evans, hereby incorporated by reference.

The entangling apparatus of FIG. 1 further includes an imaging and patterning drum 18 comprising a foraminous surface for effecting imaging and patterning of the now-entangled precursor web. After pre-entangling, the precursor web is trained over a guide roller 20 and directed to the image transfer device 18, where an image and/or pattern is imparted into the fabric on the foraminous-forming surface of the device. The web of fibers is juxtaposed to the foraminous surface 18, and high pressure water from manifolds 22 is directed against the outwardly facing surface from jet spaced radially outwardly of the foraminous surface 18. The foraminous surface 18, and manifolds 22, may be formed and operated in accordance with the teachings of commonly assigned U.S. Pat. No. 5,098,764, No. 5,244,711, No. 5,822,823, and No. 5,827,597, the disclosures of which are hereby incorporated by reference. It is presently preferred that the precursor web P be given an image and/or pattern suitable to provide fluid management, as will be further described, to promote use of the present nonwoven fabric in filtration media. The entangled fabric can be vacuum dewatered at 24, and dries at an elevated temperature on drying cans 26.

The filter media of the present invention is comprised of an electro-conductive scrim so as to assist in the time it takes to dissipate an electric charge. Suitable scrims include any number of various electro-conductive materials, such as film or a spunbond material. Spunbond fabrics are comprised continuous filaments typically formed by extrusion of thermoplastic resins through a spinneret assembly, creating a plurality of continuous thermoplastic filaments. The filaments are then quenched and drawn, and collected to form a nonwoven web. The electro-conductive scrim of the hydroentangled filtration media provides a static decay time that is 15% less than those filters without such a scrim layer.

Baghouse filter structures are typically employed in industrial applications requiring filtration of particulate material from a fluidic stream. The fluidic stream enters a filter chamber, within which, one or more generally tubular, sleeve-like filter bags are arranged. Gas flows through the exterior surface of the filter bags by the creation of a pressure differential across the filter media, with particulate material removed from the gaseous stream as the material lodges against the filter media. Under conditions where the gaseous stream causes the baghouse filter to become electrostatically charged, the electro-conductive scrim quickly dissipates the build up of electrostatic activity. Typically, the particulate material is dislodged from the exterior of the filter bags by periodically subjecting each filter bag to pulsed reverse-flow of fluid, whereby the particulate material, typically referred to as filter cake, is forced from the exterior of each filter bag, and collected at a lower portion of the structure.

Figure 2:
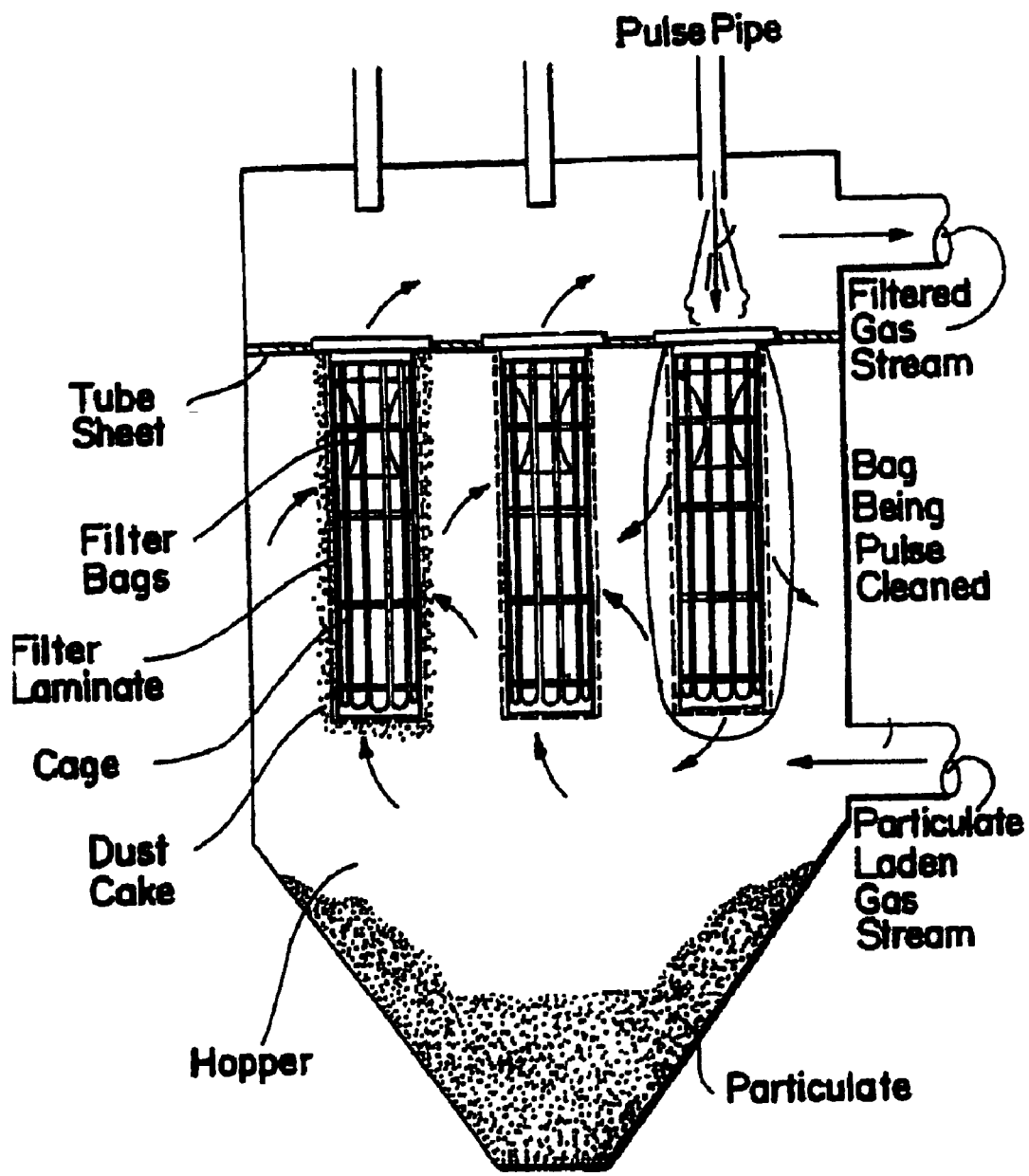
FIG. 2 is a diagrammatic illustration of baghouse filter application.

The baghouse filter media embodying the principles of the present invention may be configured as a filter bag illustrated in FIG. 2. For such applications, the filter media may be formed as a planar sheet, with opposite edges joined to form an open-ended tube. The tube can then be closed at one end to form a sleeve-like bag, as illustrated in FIG. 2. For other applications, the filter media may be employed in its planar form, or in the form of an open-ended tube.

Other potential filtration applications besides baghouse filtration include HVAC filtration, wherein a frame with a filter media is placed in the path of the flow of air to remove particles such as dust from the air before the air is circulated into a room. Food and beverage filtration is another application, whereby a filter may be placed before or after the fluid contacts the beverage making substances in order to remove contaminants from the fluid. Coalescing filtration is yet another application, such as used in diesel engines and marine applications. Coalescing filter media are commonly employed within a frame and housing located either upstream or downstream of the liquid hydrocarbon pump. Still other potential filtration applications include vacuum filter equipment, mist elimination, turbine in-take filtration, automotive and truck transmission and air in-take filtration, coolant filtration, chemical filtration, including medical and pharmaceutical filtration, power generation filtration, office equipment filtration, paper machine clothing felt and drain layer filtration, as well as filtration applications.

Filter media embodying the principles of the present invention is formed by hydroentanglement on a foraminous surface, such as disclosed in U.S. Pat. No. 5,244,711, to Drelich et al., hereby incorporated by reference. Depending upon the specific configuration of the foraminous surface, the fibrous material may have a repeating pattern imparted in the plane of the fabric or the repeating pattern may protrude from the plane of the fabric. A foraminous surface for practicing the present invention typically includes a meshed surface such as a screen, or an image transfer device having a pronounced three-dimensional topography whereby the high-pressure liquid (water) streams directed at the fibrous material for hydroentanglement can pass through the foraminous surface.

Formation of a filter media in accordance with the present invention is effected by providing a precursor web of predominantly staple length polyester fibers selected to have a basis weight corresponding to the basis weight of the filter media being formed. The precursor web is positioned faceto-face with the electro-conductive scrim and hydroentangled so as to form the nonwoven filtration media. Further, the aforementioned hydroentangled filter media can be advanced onto a three-dimensional image transfer device to impart a pattern or image into the fabric. It has also been contemplated that the electro-conductive spunbond scrim can be directly extruded onto the precursor web, lightly pre-entangled, and subsequently hydroentangled on a three-dimensional image transfer device. In accordance with the present invention, the present filter media preferably has a basis weight of no more than about 6 oz/yd$^2$, thus facilitating efficient fabrication by hydroentanglement, and cost-effective use of the fibrous material from which the media is formed.

Depending upon the composition of the precursor web from which the present filter media is formed, the strength and integrity of the material can be desirably enhanced. By incorporation of fusible fibers, such as sheath fibers or bi-component thermoplastics including polyesters, polyamides, and/or polyolefins, it is possible to effect heat-bonding of the fiber structure during heat-setting of the material, subsequent to hydroentanglement. Further, it has been found that in the absence of specific fusible fibers, heat-setting of the material can desirably enhance the strength and the porosity of the nonwoven fabric to improve its filtration characteristics.

Further still, it's within the purview of the present invention that the precursor web be comprised of durable staple length fibers, having the same or different composition. Durable staple length fibers are selected from natural or synthetic composition, of homogeneous or mixed fiber length. Suitable natural fibers include, but are not limited to, cotton, wood pulp and viscose rayon, flax, hemp, and kenaf. Particularly preferred natural fibers include silicates, such as glass, as well as polyacetonitriles and carbon fibers. Synthetic fibers, which may be blended in whole or part, include thermoplastic and thermoset polymers, including acrylics and polycarbonates. Thermoplastic polymers suitable for blending with dispersant thermoplastic resins include polyolefins, polyamides and polyesters. Thermoplastic aramids, such as alpha and para-aramids, and melamines are particularly advantageous due to their high thermal stability. The thermoplastic polymers may be further selected from homopolymers; copolymers, conjugates and other derivatives including those thermoplastic polymers having incorporated melt additives or surface-active agents.

It is also within the purview of the present invention that the filtration media comprise additional fabric layers so as to form a laminate filtration construct. The additional layers may include, but are not limited to fabrics comprised of natural, synthetic fibers, or a combination thereof. Suitable natural fibers include, but are not limited to, cotton, wood pulp and viscose rayon. Synthetic fibers, which may be blended in whole or part, include thermoplastic and thermoset polymers. The thermoplastic polymers may be further selected from homopolymers; copolymers, conjugates and other derivatives including those thermoplastic polymers having incorporated melt additives or surface-active agents.

Additionally, film layers may be added to form a laminate filtration construct. Various film layers may include, cast films, extruded films, and reticulated films.

Extruded films can be formed in accordance with the following representative direct extrusion film process. Blending and dosing storage comprising at least two hopper loaders, feed into two variable speed augers. The variable speed augers transfer predetermined amounts of polymer chip into a mixing hopper. The mixing hopper contains a mixing propeller to further the homogeneity of the polymer or a polymer mixture. The polymer chip feeds into a multi-zone extruder. Upon mixing and extrusion from multi-zone extruder, the polymer compound is conveyed via heated polymer piping through screen changer, wherein breaker plates having different screen meshes are employed to retain solid or semi-molten polymer chips and other macroscopic debris. The polymer is then fed into a melt pump, and then to a combining block. The combining block allows for multiple film layers to be extruded, the film layers being of either the same composition or fed from different systems as described above. The combining block is connected to an extrusion die, which is positioned in an overhead orientation such that molten film extrusion is deposited at a nip between a nip roll and a cast roll.

When the filtration media of the present invention is to receive a film layer extrusion, a substrate material source is provided in roll form to a tension-controlled unwinder. The base layer is unwound and moves over the nip roll. The molten film extrusion from the extrusion die is deposited onto the substrate material at the nip point between the nip roll and the cast roll. The newly formed base layer and film composite is then removed from the cast roll by a stripper roll and wound onto a new roll.

Breathable films, such as monolithic and microporous films, or reticulated films, can also be used within the laminate filtration structure. Monolithic films, as taught in U.S. Pat. No. 6,191,211, and microporous films, as taught in patent number U.S. Pat. No. 6,264,864, both patents herein incorporated by reference, represent the mechanisms of forming such breathable barrier films. Reticulated films, such as those of U.S. Pat. No. 4,381,326 and No. 4,329,309, are representative of macroporous films.

Optionally, continuous filament fabrics, including micro-denier and nano-denier fabrics, may be incorporated into a laminate filtration structure. In general, continuous filament nonwoven fabric formation involves the practice of the spunbond process. A spunbond process involves supplying a molten polymer, which is then extruded under pressure through a large number of orifices in a plate known as a spinneret or die. The resulting continuous filaments are quenched and drawn by any of a number of methods, such as slot draw systems, attenuator guns, or Godet rolls. The continuous filaments are collected as a loose web upon a moving foraminous surface, such as a wire mesh conveyor belt. When more than one spinneret is used in line for the purpose of forming a multi-layered fabric, the subsequent webs are collected upon the uppermost surface of the previously formed web. The web is then at least temporarily consolidated, usually by means involving heat and pressure, such as by thermal point bonding. Using this means, the web or layers of webs are passed between two hot metal rolls, one of which has an embossed pattern to impart and achieve the desired degree of point bonding, usually on the order of 10 to 40 percent of the overall surface area being so bonded.

Suitable nano-denier continuous filament barrier layers can be formed by either direct spinning of nano-denier filaments or by formation of a multi-component filament that is divided into nano-denier filaments prior to deposition on a substrate layer. U.S. Pat. Nos. 5,678,379 and No. 6,114,017, both incorporated herein by reference, exemplify direct spinning processes practicable in support of the present invention.

It is also in the purview of the present invention to employ the use of a three-dimensional image transfer device during hydroentanglement to impart a specifically-configured pattern into the filter media, whereby filtration characteristics of the media can be further enhanced, including an increase in the effective surface area, improvement in filter cleaning efficiency, and to alteration of depth filtration performance. As will be appreciated, this is a distinct advantage in comparison to conventional needle-punched fabrics, which ordinarily cannot be meaningfully imaged in connection with mechanical entanglement.

Use of 100% polyester staple length fibers is presently contemplated, as well as use of 90% polyester fibers in combination with 10% fusible sheath fibers. The fabric weight is selected to be no more than about 6 oz/yd$^2$.

Notably, formation of the filter media of the present invention by hydroentanglement has been found to desirably provide the filter media with the requisite strength characteristics, resistance to shrinkage, and improved static decay time. Filter media formed in accordance with the present invention is suitable for application in such industries as mining, cement, chemical, iron and steel, utilities, and work with carbon black. The disclosed filter media of the present invention preferably exhibits a Mullen burst strength of at least about 198 psi, with machine-direction and cross-direction shrinkage of less than about 3%, and more preferably, less than about 2%. The filter media preferably exhibits a machine-direction tensile strength of at least about 52 lb/in, and a cross-direction tensile strength of at least about 55 lb/in, in accordance with ASTM D461-93, Section 12.

From the foregoing, numerous modifications and variations can be effected without departing from the true spirit and scope of the novel concept of the present invention. It is to be understood that no limitation with respect to the specific embodiments disclosed herein is intended or should be inferred. The disclosure is intended to cover, by the appended claims, all such modifications as fall within the scope of the claims.

What is claimed is:

1. A laminate filter media structure comprising hydroentangled, predominant staple length fibers and an electro-conductive scrim in the form of a spunbond material to provide a reduced static decay time, said filter media structure having a basis weight of no more than about 6 oz/yd$_2$, a Mullen burst strength of at least about 198 psi, and machine-direction and cross-direction shrinkage of less than about 3% wherein said filter media exhibits a machine-direction tensile strength of at least about 52 lb/in and a cross-direction tensile strength of at least about 55 lb/in.

2. A filter media structure in accordance with claim 1, wherein said media exhibits machine-direction and cross-direction shrinkage of less than about 2%.

3. A filter media structure in accordance with claim 1, wherein said filter media is a gas filter.

4. A filter media structure in accordance with claim 1, wherein said filter media is an air filter.

5. A filter media structure in accordance with claim 1, wherein said filter media is a liquid filter.

* * * * *